J. H. SCHNEIDER.
WATER WHEEL.
APPLICATION FILED MAR. 7, 1911.

1,105,846.

Patented Aug. 4, 1914.

2 SHEETS—SHEET 1.

Witnesses:

Inventor
J. H. Schneider
By his Attorneys
Criswell & Criswell

THE NORRIS PETERS CO., PHOTO-LITHO., WASHINGTON, D. C.

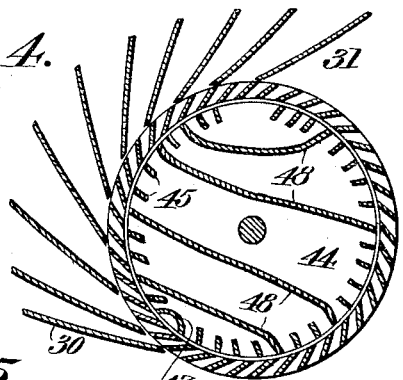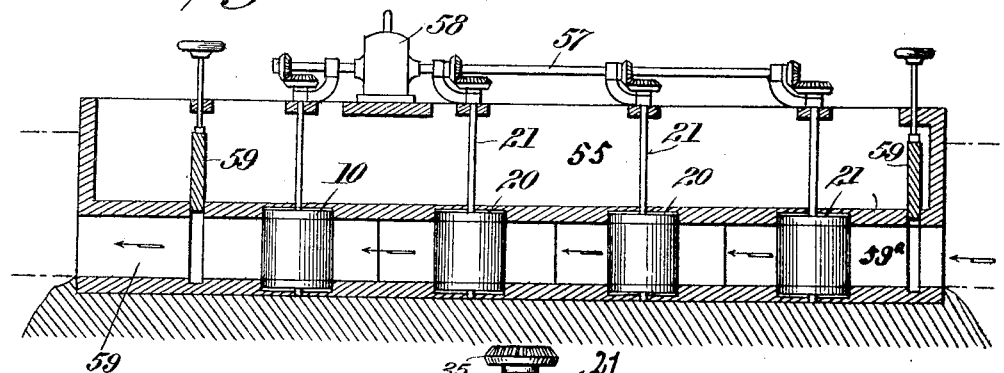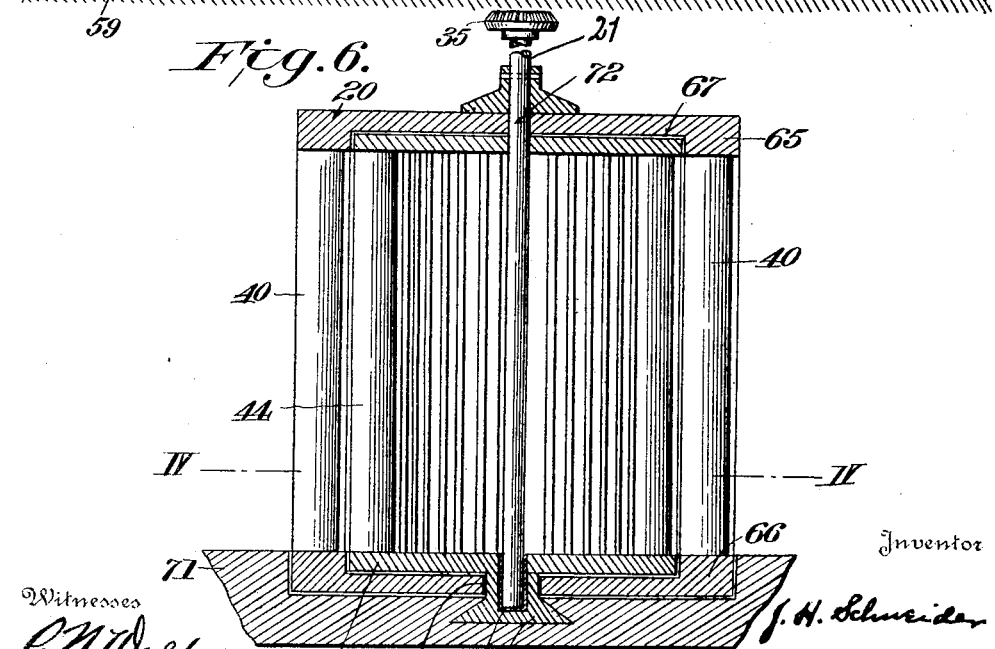

UNITED STATES PATENT OFFICE.

JOHN H. SCHNEIDER, OF BROOKLYN, NEW YORK.

WATER-WHEEL.

1,105,846.  Specification of Letters Patent.  Patented Aug. 4, 1914.

Application filed March 7, 1911.  Serial No. 612,828.

*To all whom it may concern:*

Be it known that I, JOHN H. SCHNEIDER, a German subject, and a resident of Brooklyn, county of Kings, and State of New York, have invented certain new and useful Improvements in Water-Wheels, of which the following is a full, clear, and exact description.

This invention relates particularly to improvements in water wheels and the principal objects of the invention are to provide a form of turbine wheel or member in which the water will enter at one side of the shaft, and will have exit at the opposite side; and to provide blades or guides held stationary at the interior of the wheel, for receiving the water as it enters and passes through the blades on the inlet portion, which blades will serve to direct the water to the blades at the opposite side from the inlet, in a stream substantially radial or diametrical in direction, to prevent the water being given a rotary or whirling movement by the blades at the inlet, and to cause the water to again pass the blades at the outlet side, to act on these blades and give additional impulse or power to the wheel.

With these and other objects in view, the invention will be hereinafter more particularly described with reference to the accompanying drawings, which form a part of this specification, and will then be pointed out in the claims at the end of the description.

Figure 1:
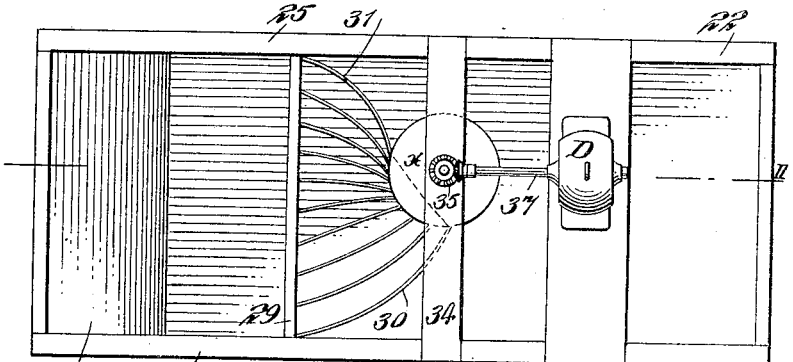
Figure 2:
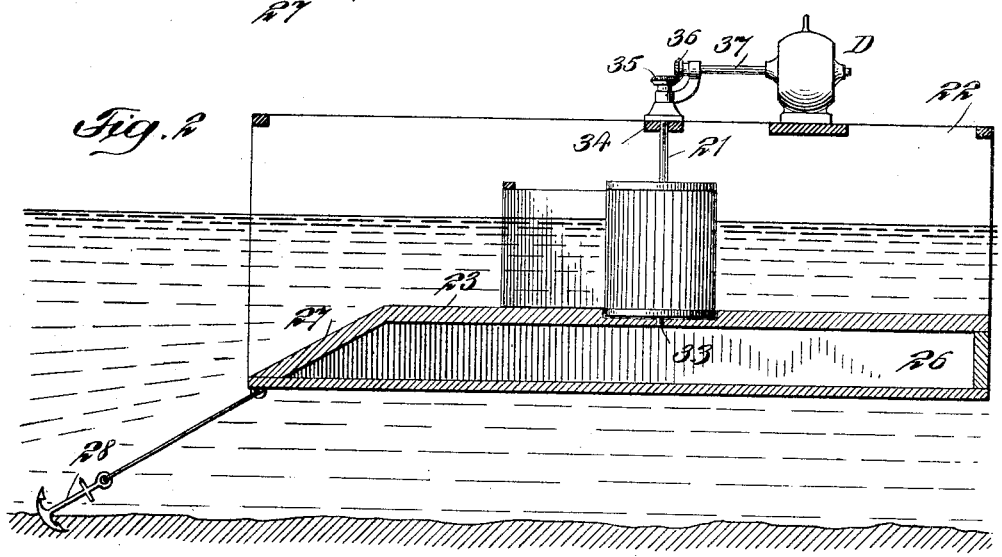
Figure 3:
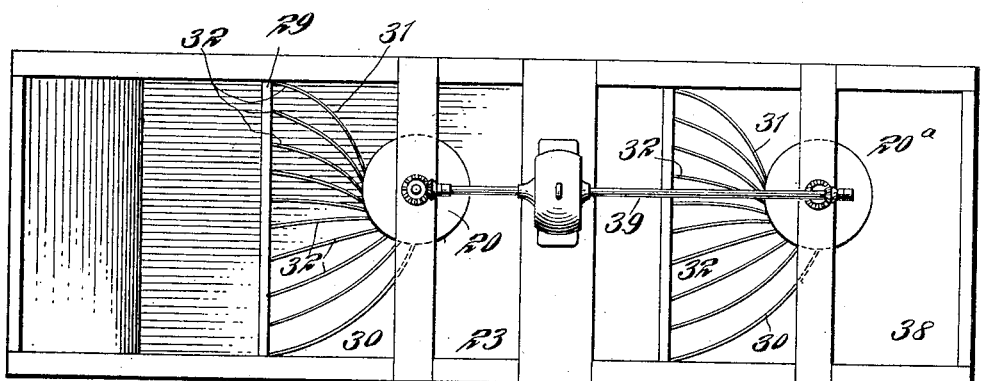

In the accompanying drawings representing embodiments of my invention, Figure 1 is a plan view of a turbine wheel provided with the chute member and shown arranged in a sluice-way, the wheel being shown connected to drive an electric motor. Fig. 2 is a vertical section on the line II—II of Fig. 1. Fig. 3 is a view of a similar construction but showing two turbine members arranged in a single sluice-way. Fig. 4 is a diagrammatic view of the wheel and chute member with interior plates extending from the inlet to the outlet portions of the wheel. Fig. 5 is a vertical section enlarged of a sluice-way having a series of turbines with the inlet chutes, shown connected to operate a motor, the sluice way provided with a gate at the end to shut off the flow of the water; Fig. 6 is a vertical axial section enlarged through one of the turbine wheels, the chute member not being shown.

This drum arrangement of turbine may be provided with this chute at a peripheral portion, with the interior of the wheel practically free as regards the revolving portion. Or adjacent the inner ends of the blades, guides or plates may be arranged to receive the water after it has acted on the blades at the inlet portion, to counteract the revolving motion that may be given to the water, and cause it to pass directly across the wheel, whereby it can engage the blades at the opposite portion or exit of the wheel, to react on these blades and give further impulse to the wheel, as the water passes these blades and leaves the wheel.

In Figs. 1 and 2 a turbine of the drum type is shown, that may be of the construction shown in Fig. 6, the wheel being generally denoted by 20, and rotatably supported by its vertical shaft 21 mounted in suitable bearings in the sluice-way or basin 22. The basin is shown as having a bottom 23 and two side members 24 and 25. A kind of false bottom member 26 may be provided that is sealed to form an air chamber for the purpose of floating the member, and which will provide an inclined portion 27 at one end to receive the water and that will have the effect of converging the water flowing into the wheel. This structure may be floated in a river or other body of water having a current, and may be secured therein by means of an anchor 28 if desired, so that the current of water will enter on the inclined bottom portion 27 and pass through the device to engage the wheel 20. This wheel it will be seen extends from the bottom up to or beyond the level of the water, but of course could be submerged. Between the side of the basin and the inlet portion of the wheel, indicated by the broken line $x$, is arranged a chute or guide member. This may comprise a blade or plate 30 extending from the side 24 to one end of the inlet line $x$, and at the opposite side a plate 31 extending from the wall 25 to the other side of the inlet or other end of the line $x$, and these members are arranged substantially convergent from the side walls of the basin to the inlet portion. The forward ends of the guide plates 30 and 31 may be secured to the side walls of the basin at opposite places thereof as shown, and may be fast to a cross beam at the top. From this it will be seen that the water entering at the end 27 will pass through the basin, and at each side of the middle portion the water will encounter the plates 30 and 31, while the middle portion will of course pass directly into the inlet of the wheel. Since the water cannot get past these plates or around the wheel, the stream will be converged and condensed, and the entire volume of water, having a cross sectional area equal to that of the basin will be reduced to that of the turbine inlet at the line $x$; which is practically one-third in these views. From this it will necessarily follow that the velocity of the water will be three times as great in passing into the wheel, as it is in entering the basin or device, and the speed of the turbine will be increased three-fold. Of course, the water passing out at the opposite side of the turbine will simply pass on through the basin or member.

Where only the two side plates 30 and 31 are used to guide the water, the condensing effect might tend to choke and impede the flow thereof, and to overcome this I provide a number of intermediate guide plates 32, that may have their forward ends all in a vertical plane with that of the outer blades 30 and 31, and spaced at equal distances apart, and fast to a cross beam 29. The rear ends of these plates extend to the periphery or inlet of the wheel, and may be also equidistant. This will subdivide the one convergent stream into a series of such streams, as it will be seen that the cross-sectional area of each of the smaller chutes, will be gradually reduced and the water passing therethrough will be condensed and have its velocity increased. But the individual chutes will insure a steady flow, and equalize the pressure throughout the extent of the inlet portion of the turbine.

In the views the shaft 21 of the wheel is shown as having a step bearing in the bottom member 23 at 33, while the upper end of the shaft rotates in a cross-beam 34, and may carry a gear 35 meshing with a gear 36 on the shaft 37 of a dynamo D, by which means the power from the flowing water will be converted into electric power, that may be conveyed for use at a distant place.

In Fig. 3 a pair of wheels 20 and 20ª, that are practically duplicates, are arranged in series in a basin 38, which wheels are both geared to a shaft 39 to drive a generator. With this arrangement the water after acting on the wheel 20, will similarly act on the wheel 20ª.

In Fig. 4 is represented in a diagrammatic manner, the guide plates or blades, such as those 30, 31 and 32 as just described. This view is practically a cross section through a wheel and the chute member, and as would appear on the line IV—IV of Fig. 6.

In Fig. 4 is shown a construction in which blades 48 are provided extending entirely across the interior of the wheel from the inlet to the outlet, and which will serve to absolutely prevent any rotative movement being imparted to the water and compel it to pass directly from the blades at the inlet to those at the outlet.

In Fig. 5 is shown in section a sluice way or structure 55. This sluice-way has therein a series of wheel members 20, four being shown as geared to a shaft 57 to drive a generator 58. In this device the basin or sluice-way is provided with a closed conduit 59ª at the lower part in which the several wheels 20 are arranged. The water passing through this conduit 59ª will engage the wheels successively. This basin or sluice-way is provided at each end with a valve or gate 59 at which the conduit can be closed. This structure is designed to be placed in a body of water that is subjected to ebb and flow of the tide.

In Fig. 6 is shown enlarged in vertical section a form of wheel with the fixed interior guides. The turbine comprises a drum formed of head members 65 and 66 connected at their outer portions by the blades 40. Inside of these members is arranged a stationary drum member comprising end plates 67 and 68 connected by the guide plates 44 whose outer edges are adjacent the inner edges of the blades 40, and which may extend substantially radial. The lower member 68 has an extension or head 69 that is shown as secured in a socket in the base member 71, and thereby this member is fixed and prevented from rotation, the lower member 66 of course has an opening 70 through which this head projects and which permits the member 66 to revolve. The shaft 21 is secured to the head 65 of the wheel, projects through an opening 72 in the end member 67 of the fixed drum, and has a step bearing in a cup member 73 in the head member 65, and this bearing serving to take the weight of the rotatable wheel. The upper end of the shaft 21 carries the gear 35 for driving the dynamo or other members. It is obvious that the long guide plates 47 and 48 may be arranged between the end members 67 and 68, since these members are stationary, and such guide plates will not interfere with the rotation of the shaft.

Having thus described my invention, I claim as new and desire to secure by Letters Patent:—

1. The combination with a drum shaped water wheel having longitudinal blades in its periphery and having an entrance for the water at one side, of a chute arranged to receive water and delivering it at the inlet of the drum, the water wheel having its outlet on the opposite side from the inlet and arranged to have the water pass from the inlet blades across the interior to the outlet blades, the water wheel also having stationary guide blades at the interior arranged to guide the water directly from the inlet to the outlet portion and prevent rotary movement of the water.

2. The combination with a drum shaped water wheel having longitudinal blades in its periphery and having an entrance for the water at one side, of a chute arranged to receive the water and deliver it at the inlet of the drum, the water wheel having its outlet on the opposite side from the inlet and arranged to have the water pass from the inlet blades across the interior to the outlet blades, the water wheel also having fixed guide blades at the interior arranged to confine the water to a straight path of movement, and located adjacent both the inlet blades and the outlet blades.

3. The combination with a drum shaped water wheel having longitudinal blades in its periphery and having an entrance for the water at one side, of a chute arranged to receive the water and to deliver it at the inlet of the drum, the water wheel having its outlet on the opposite side from the inlet, the water wheel also having stationary guide blades extending across the interior portion of the drum and arranged to direct the water from the inlet blades toward the outlet blades.

4. The combination of a drum shaped water wheel having longitudinal blades in its periphery and having an entrance for the water at one side, the water wheel having its outlet on the opposite side from the inlet and arranged to have the water pass from the inlet blades across the interior to the outlet blades, the water wheel also having stationary guide blades at the interior to guide the water and prevent rotary movement thereof in its passage from the inlet to the outlet portion.

5. The combination with a drum-shaped water wheel having longitudinal blades in its periphery and having an entrance for the water at one side, of a chute arranged to receive the water and deliver it at the inlet of the drum, the water wheel having its outlet on the opposite side from the inlet and arranged to have the water pass from the inlet blades across the interior to the outlet blades, and a curved fixed blade at the interior of the wheel to receive the water from the wheel blades adjacent one side of the inlet and deliver the same to the blades beyond the inlet.

This specification signed and witnessed this 6th day of March A. D. 1911.

JOHN H. SCHNEIDER.

Witnesses:
W. A. TOWNER, Jr.,
C. BARTELS.

---

Copies of this patent may be obtained for five cents each, by addressing the "Commissioner of Patents, Washington, D. C."